United States Patent [19]

Belter

[11] 4,418,920
[45] Dec. 6, 1983

[54] FLUID SEAL FOR ENGINE CRANKSHAFT APPLICATIONS

[75] Inventor: Jerome G. Belter, Mount Prospect, Ill.

[73] Assignee: Dana Corporation, Toledo, Ohio

[21] Appl. No.: 335,150

[22] Filed: Dec. 28, 1981

[51] Int. Cl.³ .............................................. F16J 15/34
[52] U.S. Cl. ........................................ 277/50; 277/88
[58] Field of Search ......................... 277/88, 89, 3, 50

[56] References Cited

U.S. PATENT DOCUMENTS

| | | |
|---|---|---|
| 2,593,899 | 4/1952 | Krug . |
| 2,613,960 | 10/1952 | Nelson ................................ 277/50 |
| 2,645,507 | 7/1953 | Isenbarger . |
| 2,722,439 | 11/1955 | Brummer et al. ................... 277/50 |
| 2,729,475 | 1/1956 | Chamberg et al. ................. 277/50 |
| 2,984,506 | 5/1961 | Andresen et al. . |
| 3,059,936 | 10/1962 | Barrett . |
| 3,191,945 | 6/1965 | Andresen . |
| 3,332,692 | 7/1967 | Mueller . |
| 3,355,178 | 11/1967 | Hornaday . |
| 3,372,939 | 3/1968 | Coulombe et al. . |
| 3,452,994 | 7/1969 | Gyory . |
| 3,515,393 | 6/1970 | Metcalfe . |
| 3,592,479 | 7/1971 | Andresen . |
| 3,822,066 | 7/1974 | Keys ..................................... 277/88 |
| 4,063,741 | 12/1977 | Kerr ..................................... 277/88 |
| 4,275,889 | 6/1981 | Butler et al. ......................... 277/88 |
| 4,278,218 | 7/1981 | Uhrner ................................. 277/88 |

Primary Examiner—Robert I. Smith
Attorney, Agent, or Firm—Emch, Schaffer & Schaub Co.

[57] ABSTRACT

A fluid seal is disclosed for use with a rotating shaft. The shaft is rotatably positioned in a chamber in a housing. The shaft includes a raised section against which the seal is positioned. An elastomeric diaphragm is positioned along one side of the fluid seal. A biasing means is provided to urge the seal into sealing engagement with the shaft.

15 Claims, 4 Drawing Figures

FLUID SEAL FOR ENGINE CRANKSHAFT APPLICATIONS

BACKGROUND OF THE INVENTION

This invention relates to a seal for a rotating shaft. More particularly the invention defines a seal for an engine crankshaft application.

Seals of the type of the present invention are used to provide a fluid seal between a rotating shaft and the housing in which the shaft is located. The seal is normally used to retain fluid in the housing. The fluid is frequently a lubricant, such as oil, that is used to provide lubrication for the rotating shaft and other moving components within the housing. The fluid is often under pressure or being moved within the housing by a pump or the forces generated by the rotating shaft.

To provide an adequate fluid seal, the seal is positioned in engagement with the rotating shaft. A diaphragm is also frequently used as part of the fluid seal. The diaphragm extends from the seal face to the outer housing to complete the fluid seal between the outer housing and the rotating shaft.

During the rotation of the shaft the friction between the seal and the shaft can generate considerable heat. The heat can significantly reduce the life of the seal. The heat is also transferred directly to the diaphragm or elastomeric seal in these prior art seals. As the diaphragms are normally made of an elastomeric material this excess heat can significantly reduce the effectiveness and life of the diaphragm or elastomeric member. Accordingly, there is a need for a fluid seal that effectively deals with the heat generated by the engagement of the seal against the rotating shaft. Also, as the size of the shaft increases, the surface speed of the seal significantly increases. The increased surface speed of the seal results in an increase in the heat generated and the increased heat can drastically reduce the life of the seal.

Fluid seals of the present invention are usually used in connection with crankshafts for industrial engines. The design of the prior art seals do not resist the heat generated by high surface speeds of the seal or withstand the axial movement caused by the extreme loads placed on the crankshaft in large industrial engines. Such axial movement can produce stresses in the seal element or diaphragm that can significantly reduce the life of the seal or diaphragm. Accordingly, there is a need in the prior art for a fluid seal that can accommodate such axial movement without having a detrimental effect on the diaphragm.

The prior art seals have also had difficulty in providing an initial seal between the seal face and the rotating shaft. To provide an adequate initial seal, the prior art face seals have had to resort to expensive machining techniques, such as lapping to form a mating surface between the seal and mating face on the shaft. Such machining or lapping is very expensive and significantly increases the cost of the fluid seal. Accordingly, there is a need in the prior art to provide a fluid seal with good initial sealing properties at a reasonable cost. The need for such a seal becomes increasingly significant as the size of the seal increases.

SUMMARY OF THE INVENTION

The present invention is directed to a fluid seal for use in connection with an outer housing defining a chamber. A rotatable shaft is positioned in said chamber of the outer housing. A sleeve is positioned around a section of the outer periphery of the shaft. An outer case is connected to the outer housing and the case extends around the outer periphery of the shaft. A seal carrier is positioned in the housing. The seal carrier has a surface that is positioned adjacent the sleeve and an inner member that extends around the periphery of the shaft. The inner member is positioned in spaced apart relationship to the outer case. An elastomeric diaphragm extends from the outer case to the inner member. A seal is positioned on the surface of the seal carrier for sealingly engaging the sleeve on the rotating shaft. Means are provided for biasing the seal into sealing engagement with the sleeve on the shaft.

DESCRIPTION OF PREFERRED EMBODIMENT

Figure 1:
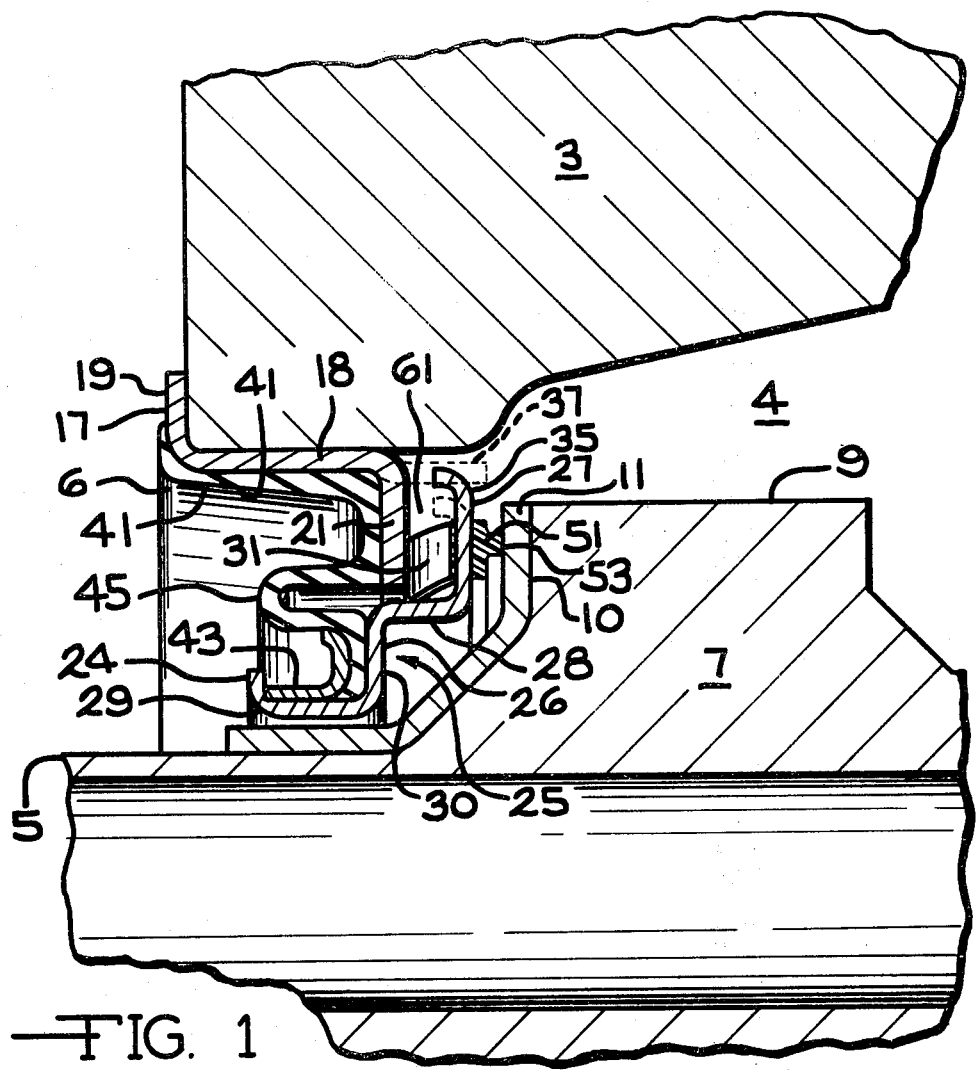
FIG. 1 is a partial cross sectional view of the fluid seal of the present invention.
Figure 2:
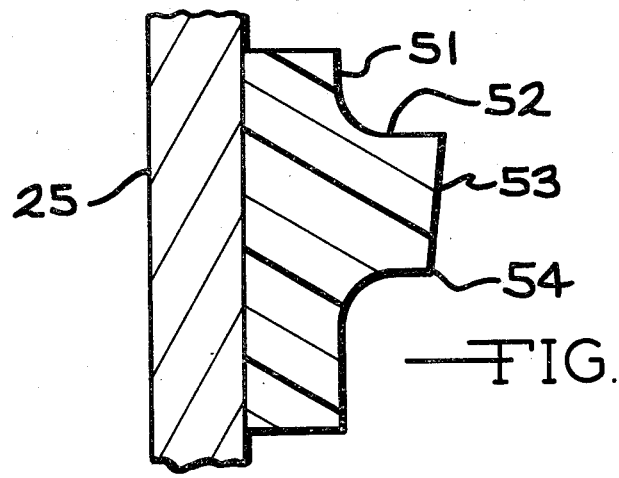
FIG. 2 is a partial cross sectional view of the seal utilized in the present invention.
Figure 3:
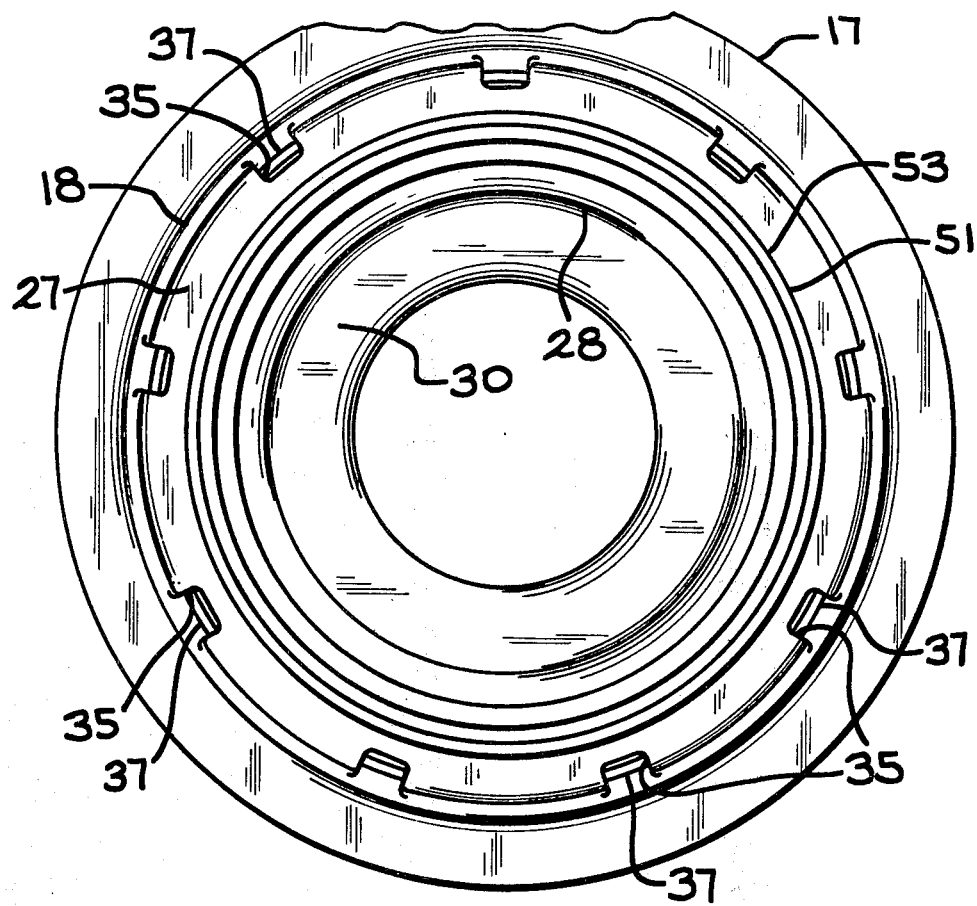
FIG. 3 is a right end view of the fluid seal.
Figure 4:
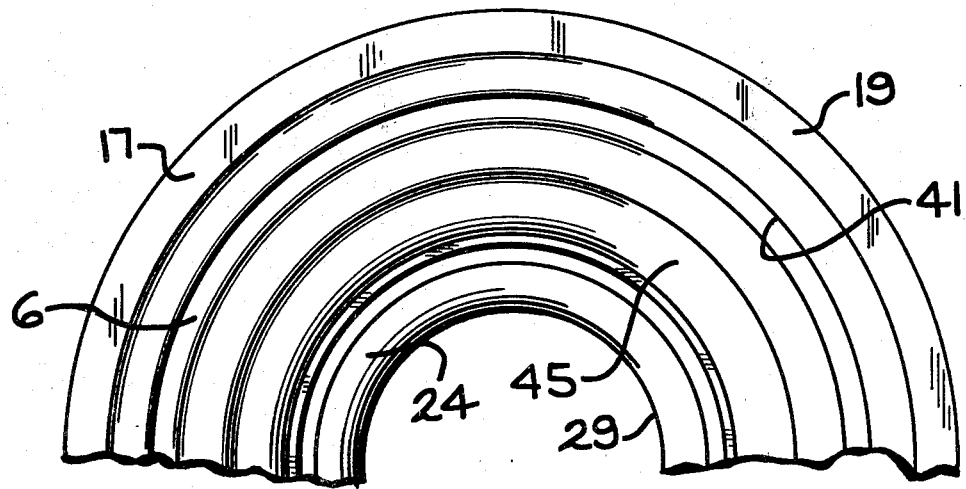
FIG. 4 is a left end view of the fluid seal.

This invention relates to a fluid seal. More particularly the invention is directed to a seal that engages a rotatable shaft. Primarily, the seal is used in connection with crankshafts for engines and other similar end uses. The features of the invention will be more readily understood by referring to the attached drawings in connection with the following description.

The fluid seal is positioned in a housing 3 and the housing defines a cavity 4. A rotatable, substantially cylindrical shaft 5 is positioned in the cavity in the housing. One end of the shaft passes through an opening 6 in one end of the housing 3. The shaft is rotatably positioned in bearings (not shown) in the housing 3. The shaft 5 is normally an engine crankshaft or other similar shaft. The shaft includes a raised portion 7 that extends around the outer periphery of the shaft 5. The raised portion forms a substantially cylindrical ring that extends from the surface of the shaft. The raised portion 7 is located on only a section of the shaft that is adjacent one end of the housing 3. The raised portion 7 terminates in a surface 9 that is in opposed spaced apart relationship with the housing 3. The raised portion 7 includes a side 10 that is substantially perpendicular to the longitudinal axis of the shaft. A sleeve 11 is positioned along the side 10 of the raised portion 7 and extends onto a position of the outer periphery of the shaft 5. The sleeve 11 is constructed of a material having good wear characteristics and forms a wear surface on the raised portion 7 of the shaft.

An outer case 17 is positioned in the opening 6 in the housing 3. Normally the outer case is pressed into the opening 6 to secure the case to the housing. The outer case has a base 18 that is positioned along the section of the housing 3 that forms the opening 6 and a first leg 19 that extends from the base along the end wall of the housing 3. The outer case has a second leg 21 that extends from the base 18 in direction towards the shaft 5. The second leg 21 terminates in spaced apart relationship with the shaft 5.

A seal carrier 25 is positioned adjacent the outer case 17. The seal carrier 25 has a first section 27 that is positioned in adjacent, spaced apart relationship with the second leg 21 of the outer case 17 and the side 10 on the raised portion 7. The first section 27 is substantially parallel to the second leg 21 and substantially parallel to the side 10 of the raised portion 7 on the rotatable shaft 5. The first section 27 of the seal carrier 25 is also in a substantially parallel opposed relationship to the sleeve 11 positioned on the side 10 of the raised portion 7. The seal carrier 25 has a second section 29 that is substantially parallel to the base 18 of the outer case 17 and the surface of the shaft 5. The second section has a lip 24 that extends from the end of the second section that is adjacent the opening 6. The lip extends in a direction that is substantially perpendicular to the second section 29. The second section 29 is positioned adjacent the surface of the shaft 5. The first section 27 and second section 29 are connected together by a substantially L shaped section 26 of the seal carrier. The first leg 28 of the L shaped section is connected to the first section 27 and the second leg 30 is connected to the second section 29. The first leg 28 is substantially perpendicular to the first section 27 and the second leg 30. The second leg 30 is substantially perpendicular to the second section 29.

The seal carrier 25 is held in position by a biasing means or spring 31 that extends from the second leg 21 of the outer case to the first section 27 of the seal carrier. The spring 31 also acts to bias the first section 27 of the seal carrier towards the sleeve 11 and raised portion 7 of the rotatable shaft 5.

The end of the first section 27 of the seal carrier 25 that is adjacent the housing 3 contains a plurality of recesses 35. The recesses are positioned in spaced relationship around the outer periphery of the seal carrier 25. A plurality of lugs 37 extends from the second leg 21 of the outer case 17 and the lugs engage the recesses 35 in the first section 27 of the seal carrier 25. The positioning of the lugs 37 in recesses 35 locks the seal carrier to the outer case and substantially eliminates any rotational movement between the seal carrier 25 and the outer case 17.

A molded elastomeric diaphragm 41 extends from the outer case 17 to the seal carrier 25. One end of the elastomeric diaphragm is secured to the base 18 and the second leg 21 of the outer case 17. The other end of the elastomeric diaphragm terminated on the second section 29 of the seal carrier 25. A portion of the diaphragm extends along the second leg 30 of the seal carrier. A bracket 43 is positioned on the second section 29. One end of the bracket engages the lip 24 and the other end of the bracket engages the portion of the diaphragm that extends along the second leg 30 of the seal carrier 25. The bracket wedgingly secures the elastomeric diaphragm 41 to the seal carrier 25. The elastomeric diaphragm 41 contains a loop 45 and the loop is positioned between the end of the second leg 21 of the outer case and the second section 29 of the seal carrier 25. The loop 45 allows the elastomeric diaphragm to move in a rolling fashion if there is any axial movement between the outer case 17 and the seal carrier 25. The diaphragm is molded into the operating configuration shown, including the loop 45, to reduce stresses in the diaphragm and to accommodate movement of the components of the fluid seal.

A seal face member is positioned on the first section 27 of the seal carrier 25. The seal face member is positioned on the surface of the first section 27 that is adjacent the raised portion 7 of the rotatable shaft 5. The seal 51 has a raised section 52 that terminates in a face 53. The face 53 of the seal is positioned for engaging the sleeve 11 on the raised portion 7 of the shaft 5. The face of the seal is machined at an angle to create a knife edge 54 for initial sealing with the sleeve 11. The seal is usually made from Victolon or other similar material. As the shaft 5 rotates the face 53 of the seal 51 and the sleeve 11 becomes lapped and mated to create a positive fluid seal. As the shaft rotates the face 53 of the seal 51 wears until the entire face of seal is in sealing engagement with the sleeve 11 on the raised portion 7 of the shaft 5. The width of the raised section 52 provides a wear indicator to assist in determining when the seal is sufficiently worn to need replacing. Normally, the seal 51 is replaced at least by the time the raised section 52 on the seal 51 is worn away.

A cavity 61 is formed between the outer case 17, the diaphragm 41 and the seal carrier 25. The cavity 61 is in communication with the chamber 4 defined by the housing 3. Fluid in the chamber is free to flow into the cavity 61.

Normally a fluid or lubricant is contained in the cavity 4 for lubricating the shaft and other moving components within the cavity. Accordingly, it is necessary to retain the fluid within the cavity and to prevent foreign material from entering the cavity and contaminating the fluid. To prevent the leakage of fluid from the cavity 4 the fluid seal is positioned at one end of the housing. The fluid seal contains a seal carrier 25 and seal 51 that are pressed against the sleeve 11 on the raised portion 7 of the rotatable shaft 5. The seal forms a barrier to prevent fluid from passing along the side on the raised portion where the seal is located and thereby prevents fluid from being discharged from the cavity 4. The seal is held in position against the raised portion 7 of the rotatable shaft by biasing means 31. The biasing means 31 is positioned so that it acts upon the seal carrier to move the seal directly towards the sleeve 11 on the raised portion 7. The biasing means is constructed so that the seal carrier and seal remain substantially parallel to the side 10 of the raised portion 7 as the seal 51 is biased towards the sleeve. The configuration of the biasing means effects a direct loading of the seal against the sleeve. It is important that the biasing means exert enough force on the seal to provide a barrier to the flow of fluid along the surface of the raised portion 7 without causing the seal 51 to wear too quickly.

The raised portion 7 on the shaft 5 assist in providing a fluid seal between the seal 51 and sleeve 11. The raised portion acts as a slinger as the shaft 5 is rotated. The centrifugal forces developed by the rotating raised portion cause the fluid to move away from the shaft 5 and raised portion 7 into the cavity 4 in the housing 3. Accordingly, the raised portion 7 acts to reduce the fluid splash against the seal 51 and assist in providing a fluid seal between the seal 51 and sleeve 11 on the raised portion 7 of the shaft 5.

The fluid in the cavity 4 can also enter into the cavity 61 formed between the outer case 17, the diaphragm 41 and the seal carrier 25. The fluid is retained in the cavity 61 by the diaphragm that forms the outer wall of the cavity. Accordingly, the fluid from cavity 4 can enter the cavity 61 and not be discharged from the housing.

Frequently, it is difficult to provide a good initial fluid seal without resorting to expensive lapping or other machining techniques to provide an appropriate sealing surface between the seal face and the surface the seal contacts. The present invention eliminates this difficulty. The seal 51 is provided with a knife edge 54 on the face 53 that contact the sleeve 11. The knife edge in combination with the Victolon material of the seal provides initial sealing between the face 53 of the seal and the surface of the sleeve 11. As the shaft 5 rotates the face 53 and sleeve 11 becomes lapped and mated to create a positive fluid seal. This positive fluid seal normally last for the useful life of the seal 51. As the shaft rotates the face 53 of the seal 51 wears until the entire face 53 is in sealing engagement with the sleeve.

It is also important to prevent foreign material from entering the housing 3 and contaminating the fluid in chamber 4. The outer case 17 is positioned adjacent the end of the housing 3. The elastomeric diaphragm 41 extends from the outer case 17 to the seal carrier 25 and forms a barrier to foreign material that might be present at this end of the housing. In addition, the seal carrier 25 has a second section 29 that is positioned in substantially parallel relationship to the rotatable shaft 5. The second section 29 is positioned in immediately adjacent relationship to the rotatable shaft. Normally the clearance between the second section 29 and the shaft 5 is sufficient only to allow for the unrestricted rotation of the shaft. The positioning of the second section 29 adjacent the shaft 5 prevents any substantial quantity of foreign matter from passing between the second section 29 and shaft 5. If any foreign material manages to pass between the second section 29 and the shaft 5 this foreign material is prevented from entering the chamber 4 by the seal 51 that is positioned between the seal carrier 25 and the raised portion 7 on the rotatable shaft 5.

During the rotation of the shaft 5 frictional drag is created between the seal 51 and the sleeve 11 on the raised portion 7 of the shaft 5. The frictional drag generates heat that can reduce the life of the seal and also the life of the elastomeric diaphragm located behind the seal carrier 25. In the fluid seal of the present invention, the diaphragm is spaced from the seal. The space acts as an insulator and reduces the transfer of heat from the seal 51 to the diaphragm 41. In addition, the cavity 61 located between the seal carrier 25 and diaphragm 41 is in communication with the cavity 4. The fluid in chamber 4 of the housing 3 is free to flow into the cavity 61. The fluid is maintained in the cavity by the elastomeric diaphragm 41 and outer case 17 which form the outer surface of the cavity. Normally the fluid in the chamber 4 will flow in and around the cavity 61 and be continually replaced as the shaft 5 rotates. The fluid in the cavity 61 acts as a heat transfer fluid that removes heat generated by the frictional drag between the seal and the raised portion 7 of the rotatable shaft. Accordingly, the fluid removes the heat that can reduce the life of the seal 51 and be damaging to the elastomeric diaphragm 41.

During the operation of the invention there may be movement between the outer case 17 and the seal carrier 25 in an axial direction along the rotatable shaft 5. To accommodate this possible axial movement the elastomeric diaphragm 41 is provided with a loop 45 between the outer case 17 and the seal carrier 25. The loop provides sufficient elastomeric material to accommodate any such anticipated axial movement. During such axial movement the loop 45 moves in a rolling manner to prevent the build up of stresses in the elastomeric diaphragm.

It is also undesirable to have any rotational movement between the outer case 17 and the seal carrier 25. To prevent such rotational movement lugs 37 extend from the outer case 17 and engage recesses 35 located in the first section 27 of the seal carrier 25. The lugs effectively lock the outer case 17 and the seal carrier 25 together and prevent rotational movement between the seal carrier and the outer case.

The positioning of the seal 51 against the raised portion 7 of the rotatable shaft 5 can result in wear on the surface of the raised portion. To reduce the wear that might be produced on the raised portion 7 a sleeve 11 is positioned on the face of the raised portion 7 that is encountered by the seal 51. The sleeve is constructed of a wear resistant material that also provides a good sealing surface for the seal 51. In addition, if the sleeve 11 becomes worn after a sufficient period of use the sleeve can be replaced without replacing the entire rotatable shaft 5.

Having described the invention in detail with reference to the drawings, it is understood that such specifications are given for the sake of explanation. Various modifications and substitutions, other than those cited, can be made without departing from the spirit and scope of the invention as defined in the following claims.

I claim:

1. A fluid seal for sealing between a stationary outer housing defining a chamber and a rotatable shaft having a sealing surface positioned in said chamber of said outer housing, said fluid seal comprising:
   a raised surface on said shaft, said raised surface extending around the outer periphery of said shaft, said raised surface having a side that extends from said shaft in a direction substantially perpendicular to the surface of said shaft, said sealing surface located on said raised surface;
   an outer case for connecting to said outer housing, said case adapted for extending around the outer periphery of said shaft;
   a seal carrier for positioning in said housing, said seal carrier having a surface positioned adjacent said sealing surface on said shaft and an inner member extending around the outer periphery of said shaft, said inner member being in spaced apart relationship with said surface, said inner member positioned in spaced apart relationship to said outer case;
   a elastomeric diaphragm extending from said outer case to said inner member, said diaphram being spaced apart from said surface of said seal carrier;
   a cavity defined between said outer case and said seal carrier, said cavity acting to insulate said diaphragm to reduce the transfer of heat from said seal to said diaphragm, said cavity being in communication with said chamber in said outer housing whereby fluid in said chamber can flow into said cavity to cool said seal and said diaphragm, said diaphragm forming one wall of said cavity;
   a seal positioned on said surface of said seal carrier for sealingly engaging said sealing surface on said shaft, said seal being spaced apart from said diaphragm whereby heat generated by said seal is not directly transferred to said diaphragm;
   means for biasing said seal into sealing engagement with said sealing surface on said shaft.

2. The seal of claim 1 wherein said shaft includes a raised surface that extends around the outer periphery of said shaft, said raised surface having a side that extends from said shaft in a direction substantially perpendicular to the surface of said shaft, said sealing surface located on said raised surface.

3. The seal of claim 1 where a sleeve is positioned on said side of said raised surface, said sleeve acting as a wear surface on said raised surface.

4. The seal of claim 3 wherein said surface of said seal carrier is positioned substantially parallel to said raised surface and said seal engages said sleeve on said raised surface.

5. The seal of claim 4 wherein said outer case contains a leg that extends from said outer housing in a direction towards said shaft, said leg being substantially parallel to said side of said raised surface.

6. The seal of claim 5 wherein a spring is positioned between said leg of said outer case and said surface of said seal carrier to bias said seal into sealing engagement with said sleeve on said raised surface of said shaft.

7. The seal of claim 3 wherein said raised surface and said sleeve act as a slinger as said shaft rotates to reduce fluid splash on said seal.

8. The seal of claim 1 wherein at least one lug extends from said outer case, said lug engages said seal carrier to prevent rotation between said outer case and said seal carrier.

9. The seal of claim 8 wherein said seal carrier contains at least one notch for receiving said lug.

10. The seal of claim 1 wherein said elastomeric diaphragm contains a U-shaped loop, said loop positioned to effect a rolling action in the event of axial movement between said outer case and said seal carrier.

11. The seal of claim 1 wherein said seal has a raised section that extends in a direction towards said sleeve on said raised surface of said shaft.

12. The seal of claim 11 wherein said raised section terminates in a surface that is substantially parallel to said side of said raised surface of said shaft.

13. The seal of claim 12 wherein said surface of said seal is disposed at an angle and defines a knife edge section that initially engages and forms a fluid seal with said sleeve.

14. The seal of claim 11 wherein said raised section of said seal defines a wear surface for said seal.

15. A fluid seal comprising:
a stationary outer housing defining a chamber;
a rotatable shaft positioned in said chamber of said housing, said shaft having a raised surface that extends around the outer periphery of said shaft, said raised surface having a side that extends from said shaft in a direction substantially perpendicular to the surface of said shaft;
a sleeve positioned on said side of said raised surface of said shaft, said sleeve extending around the outer periphery of said shaft;
an outer case connected to said outer housing, said case extending around the outer periphery of said shaft, said case including a leg that extends from said housing towards said shaft;
a seal carrier positioned in said housing, said seal carrier having a surface positioned adjacent said sleeve and an inner member extending around the outer periphery of said shaft, said surface of said seal carrier being spaced apart from and substantially parallel to said leg of said outer case, said inner member being positioned in spaced apart relationship with said surface and said outer case;
an elastomeric diaphragm extending from said outer case to said inner member, said diaphragm extending along at least a portion of said leg of said outer case, said diaphragm being in spaced apart relationship to said surface of said seal carrier, said diaphragm having a U-shaped loop, said loop positioned to effect a rolling action to accommodate axial movement between said outer case and said seal carrier and to reduce stress on said diaphragm during such axial movement;
a cavity defined between said leg of said outer case and said seal carrier, said cavity acting to insulate said diaphragm to reduce the transfer of heat from said seal to said diaphragm, said cavity being in communication with said chamber in said outer housing whereby fluid in said chamber can flow into said cavity to cool said seal and said diaphragm, said diaphragm forming one wall of said cavity;
a seal positioned on said surface of said seal carrier for sealingly engaging said sleeve on said shaft, said seal having a raised section that extends in a direction towards said sleeve, said raised section terminating in a surface for engaging said sleeve, said surface of said seal being disposed at an angle to define a knife edge for engaging said sleeve; and
a spring positioned between said leg of said outer case and said seal carrier, said spring acting to bias said seal carrier and said seal into sealing engagement with said sleeve on said shaft.

* * * * *